United States Patent [19]

Miller et al.

[11] Patent Number: 4,813,284
[45] Date of Patent: Mar. 21, 1989

[54] METHOD FOR ESTABLISHING A CLEAN INTERFACE IN A LEAK DETECTOR IN AN ABOVE GROUND STORAGE TANK

[75] Inventors: David C. Miller, Downers Grove; Arthur R. Brown, Warrenville, both of Ill.

[73] Assignee: Amoco Corporation, Chicago, Ill.

[21] Appl. No.: 158,297

[22] Filed: Feb. 19, 1988

Related U.S. Application Data

[63] Continuation-in-part of Ser. No. 31,546, Mar. 30, 1987, Pat. No. 4,736,622.

[51] Int. Cl.$^4$ .............................................. G01M 3/32
[52] U.S. Cl. ...................................... 73/49.2; 73/295
[58] Field of Search ................ 73/49.2, 291, 293, 295, 73/304 R, 304 C; 340/605, 620, 622; 210/222, 695

[56] References Cited

U.S. PATENT DOCUMENTS

| | | | |
|---|---|---|---|
| 2,279,043 | 4/1942 | Harrington | 73/295 |
| 3,964,311 | 6/1976 | Holmen | 73/295 |
| 4,287,756 | 9/1981 | Gallagher | 73/304 R X |
| 4,646,560 | 3/1987 | Maresca, Jr. et al. | 73/299 X |

Primary Examiner—Michael J. Tokar
Assistant Examiner—Joseph W. Roskos
Attorney, Agent, or Firm—Thomas W. Tolpin; William H. Magidson; Ralph C. Medhurst

[57] ABSTRACT

The method for detecting leaks in an above ground storage tank includes the step of first determining the level of water in the tank by establishing, in a container lowered into and resting on the bottom of the tank, a clean interface between water and a liquid hydrocarbon product in the tank which has entered into the container. Preferably the method includes an initial step of inserting a predetermined amount of water into the container before lowering the container into the tank. The method also includes sensing changes in conductivity along a line intersecting an interface between the liquid hydrocarbon product in the tank and water in the tank with a leak detector in a casing and establishing a clean interface in the leak detector to prevent debris at the interface in the tank from fouling the sensing of changes of conductivity. Further, the method of establishing a clean interface in the container or the casing includes lowering the container or casing which is substantially closed and which is provided with an opening at the upper end thereof into the tank until it reaches the bottom of the tank; opening an inlet/outlet opening in the lower end of the container or casing after it has settled on the bottom of the tank; and, allowing a clean interface to be established in the container or casing.

19 Claims, 8 Drawing Sheets

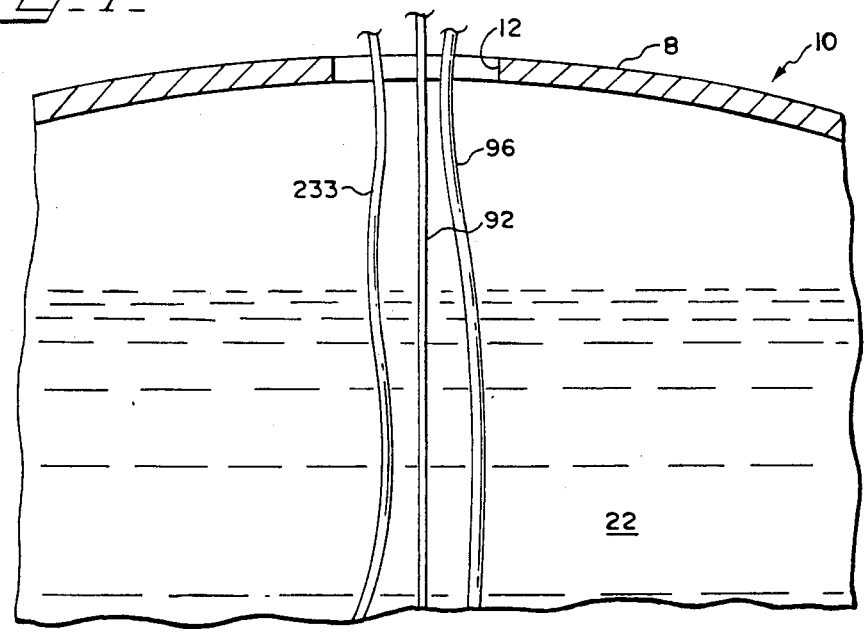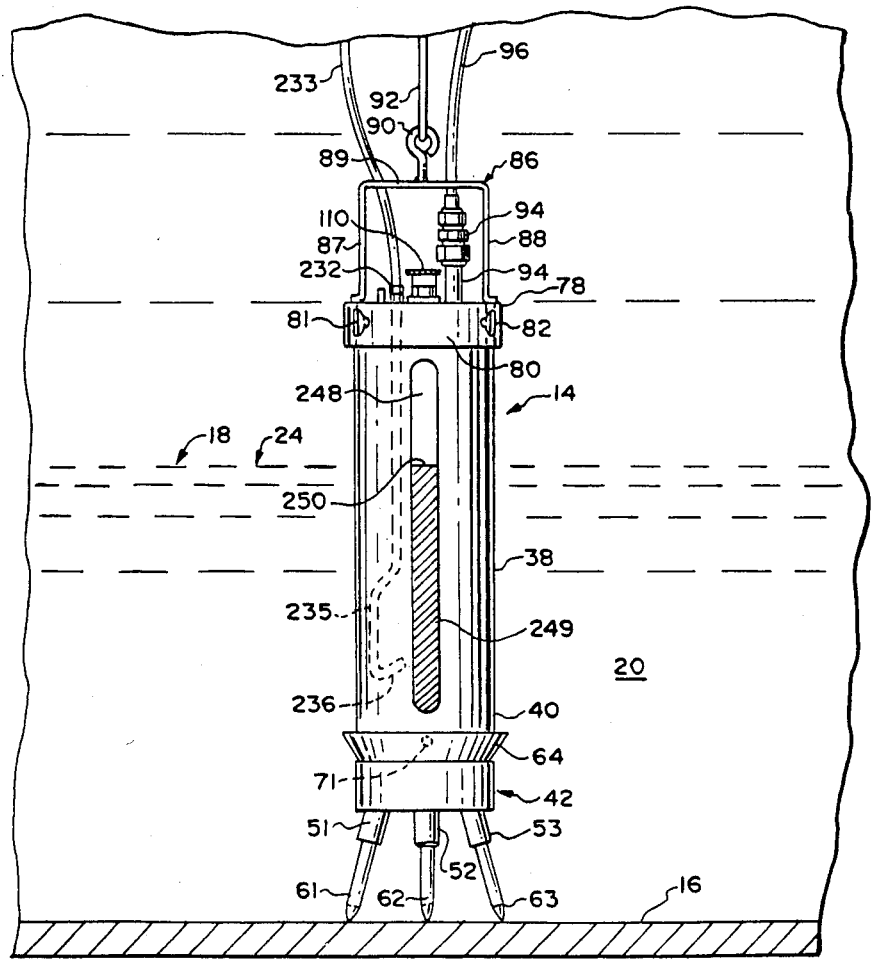

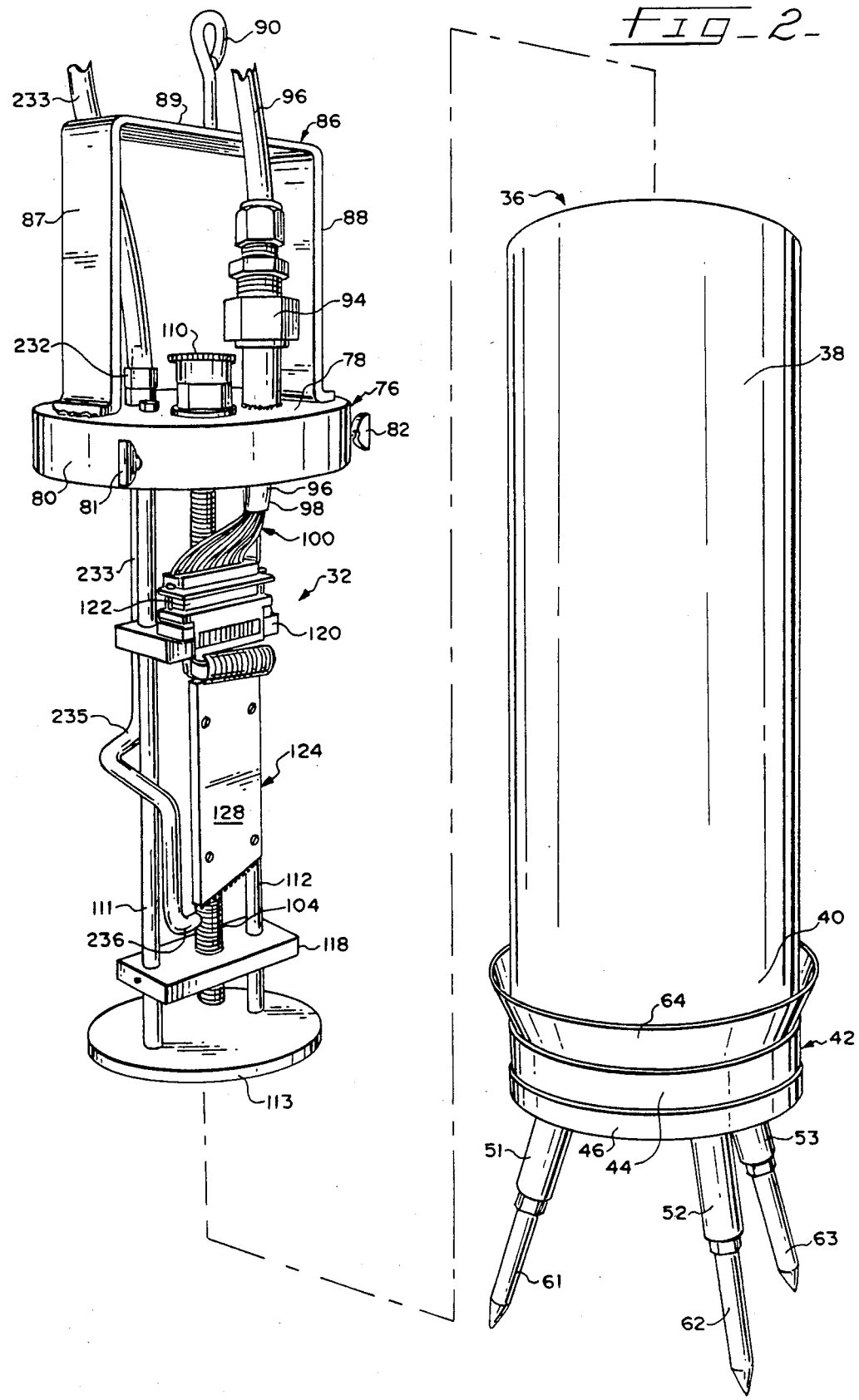

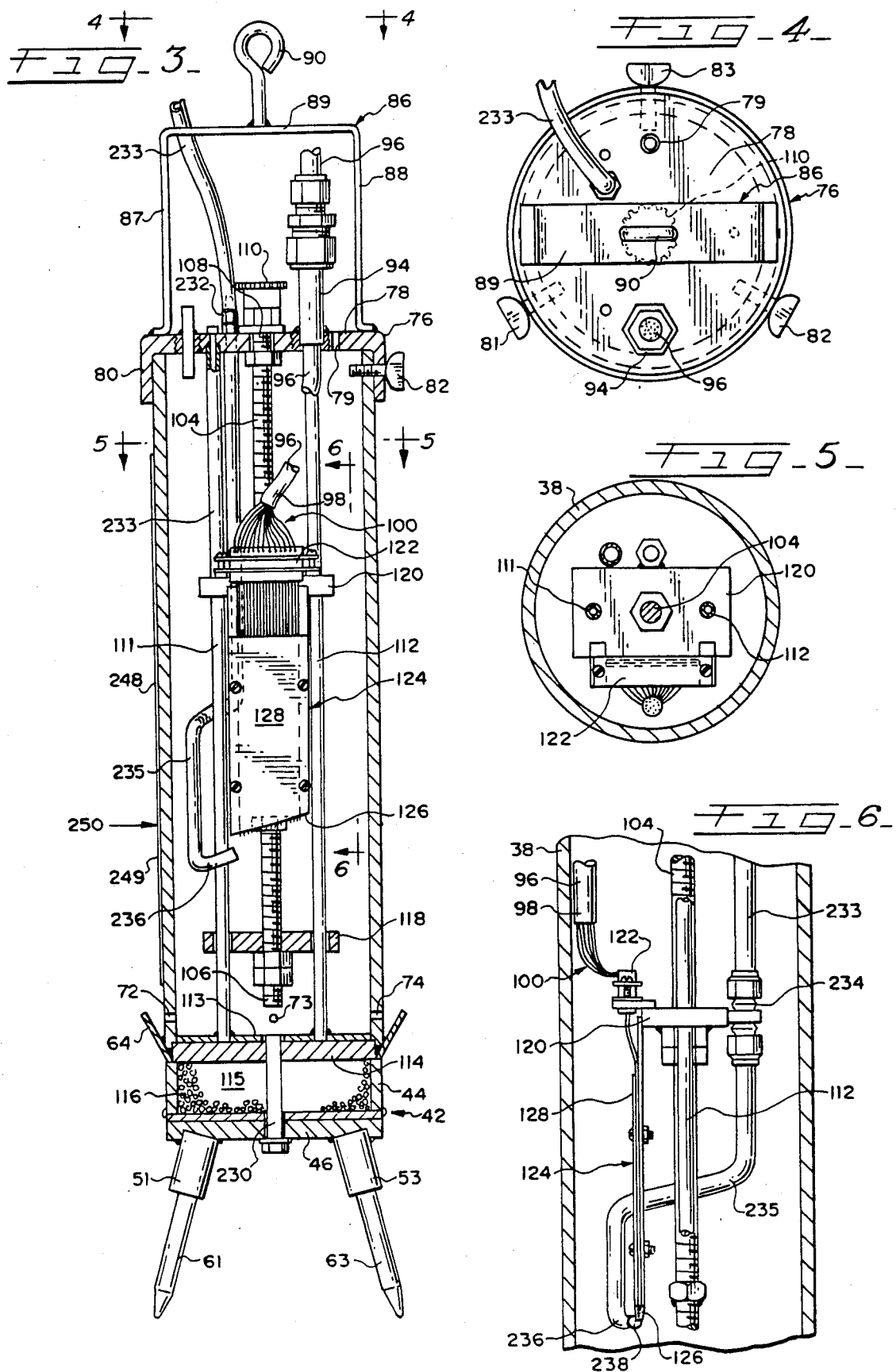

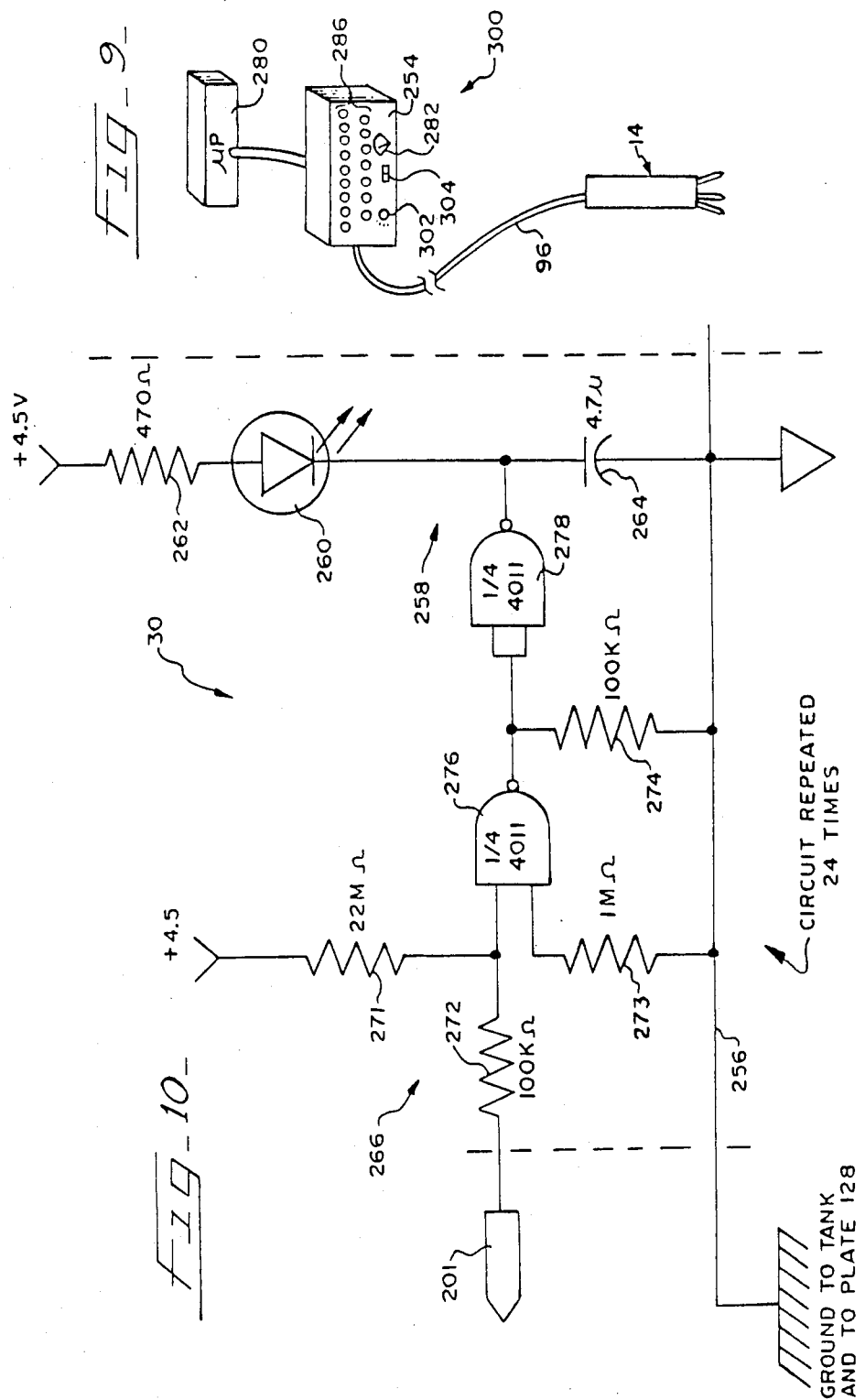

METHOD FOR ESTABLISHING A CLEAN INTERFACE IN A LEAK DETECTOR IN AN ABOVE GROUND STORAGE TANK

CROSS REFERENCE TO RELATED APPLICATIONS

This application is a continuation-in-part of U.S. Pat. No. 4,736,622, issued Apr. 12, 1988, Ser. No. 31,546 filed Mar. 30, 1987 of David C. Miller and Arthur R. Brown for A Method for Detecting Leaks in an Above Ground Petroleum Storage Tank.

BACKGROUND OF THE INVENTION

1. Field Of The Invention

The present invention relates to a method for establishing a clean interface between a liquid product and water in a leak detector in an above ground storage tank. More specifically, the present invention relates to a method for preventing debris at and in the area of a petroleum-water interface in the storage tank from affecting detection of leaks with a sensor assembly extending across the interface in the leak detector, thereby to prevent fouling of conductivity sensors of the sensor assembly with such debris.

2. Description Of The Prior Art

Leaks in large above ground petroleum product storage tanks containing liquids such as regular gasoline, light fuel oil, diesel fuel and regular gasoline are a serious problem to the petrochemical industry from the standpoint of both inventory losses and environmental degradation The large size of such tanks makes leak detection difficult. In this respect, a leak rate of one barrel per hour in a 100 foot diameter tank will produce a level change rate of approximately 0.01 inches per hour and a direct measurement of the level change at the surface of the liquid in the tank is difficult due to the resolution required and to thermal expansion of the liquid, the tank and the detecting apparatus.

Furthermore, acoustic emission methods of leak detection previously utilized provide results which are clouded by the weakness of the leak as an acoustic source and by signal attenuation in the liquid or in the tank shell. Furthermore, background noise from wind and thermal expansion also appear to limit the reliability of leak detection determinations utilizing acoustic emissions.

Experience has shown that all significant leaks in above ground tanks occur in the area of the tank bottom. Also, experience has shown that thermal conditions near the bottom of the tank are stable. Furthermore, surface waves and convection currents in the liquid are effectively dampened by the time they reach the bottom of the tank.

A method for detecting leaks utilizes the environment adjacent the bottom of the tank for detecting leaks and the leak detector utilized in practicing this method is adapted to be positioned in the stable zone adjacent the bottom of the tank. With the method of the present invention, a clean interface between the liquid product in the tank and water in the leak detector in the tank is established, preferably by preventing debris at interface from entering the tank. This method can be practiced solely for locating the clean interface line or water level height in the tank or in a leak detector for establishing a clean interface therein between the liquid product and water in the tank and to prevent fouling of conductivity sensors of the leak detector situated in the casing of the detector in the tank.

SUMMARY OF THE INVENTION

According to the invention there is provided a method for detecting leaks in an above ground storage tank including the step of first determining the level of water in the tank by establishing, in a container lowered into and resting on the bottom of the tank, a clean interface between water and a liquid hydrocarbon product in the tank which has entered into the container. Preferably the method includes an initial step of inserting a lo predetermined amount of water into the container before lowering the container into the tank. The method also includes sensing changes in conductivity along a line intersecting an interface between the liquid hydrocarbon product in the tank and water in the tank with a leak detector in a casing and establishing a clean interface in the leak detector to prevent debris at the interface in the tank from fouling the sensing of changes of conductivity. Further, the method of establishing a clean interface in the container or the casing includes lowering the container or casing which is substantially closed and which is provided with an opening at the upper end thereof into the tank until it reaches the bottom of the tank; opening an inlet/outlet opening in the lower end of the container or casing after it has settled on the bottom of the tank; and, allowing a clean interface to be established in the container or casing.

BRIEF DESCRIPTION OF THE DRAWINGS

FIG. 1 is a fragmentary vertical sectional view, with large portions broken away, of an above ground petroleum storage tank showing the leak detector of the present invention resting on the bottom of the tank.

FIG. 2 is an exploded perspective view of a cylindrical casing for the leak detector showing a sensor assembly separated from the cylindrical casing for housing the sensor assembly.

FIG. 3 is a vertical sectional view through the leak detector shown in FIG. 1.

FIG. 4 is a top plan view of the leak detector shown in FIG. 3 and is taken along line 4—4 of FIG. 3.

FIG. 5 is a horizontal sectional view of the leak detector shown in FIG. 3 and is taken along line 5—5 of FIG. 3.

FIG. 6 is a fragmentary vertical view of the leak detector shown in FIG. 3 and is taken along line 6—6 of FIG. 3.

FIG. 9 is a block, partially mechanical partially schematic drawing, not to scale, of one embodiment of the overall detecting system including the leak detector, a control panel with lamps and conductivity meter and an optional microprocessor.

FIG. 10 is a schematic circuit diagram of an electrical circuit that is mounted in the control panel shown in FIG. 9 and is connected to one sensor conductor in the sensor assembly shown in FIG. 7 or 8.

DESCRIPTION OF THE PREFERRED EMBODIMENT

Figure 8:
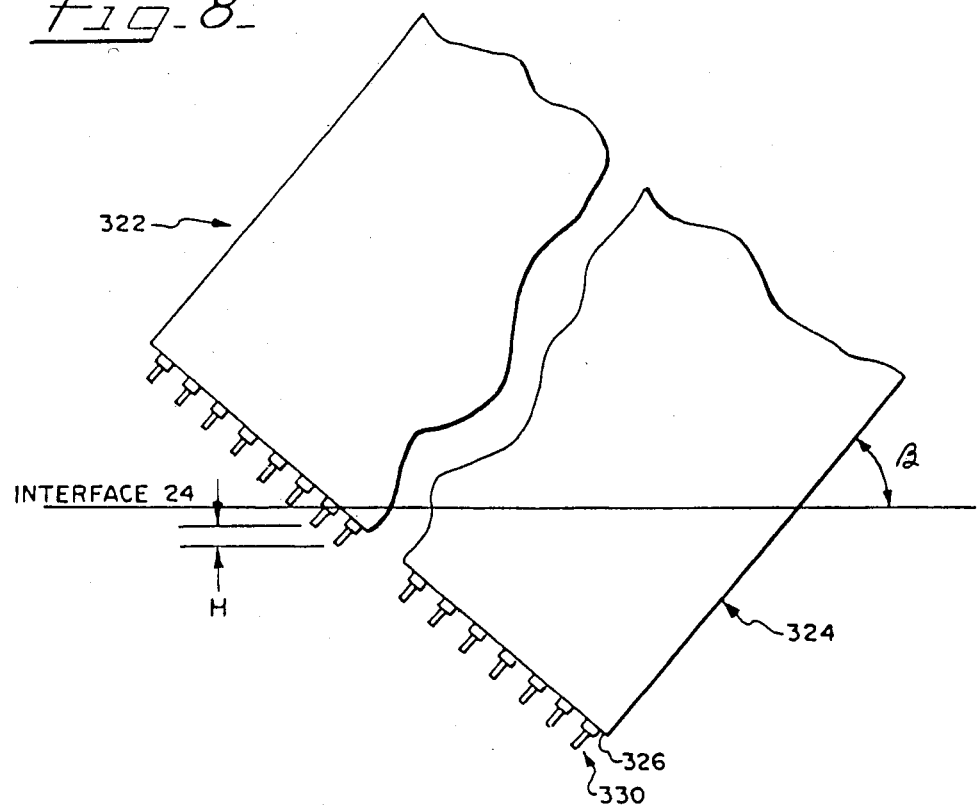
FIG. 8 is a vertical plan view of another embodiment of the sensor array shown in FIG. 7.

In FIG. 1 there is shown a fragmentary upper wall portion or top 8 of a petroleum storage tank 10 with an access hole 12 therein which is adapted to be sealed by a cap, and through which the leak detector 14 can be inserted for being lowered to the bottom or bottom wall 16 of the tank 10 and then utilized for checking for leaks and subsequently withdrawn from the top 8 of the tank 10.

The leak detector 14 is shown resting on the bottom wall 16 of the tank 10.

Typically, in a petroleum storage tank 10 a small amount of moisture or water will accumulate on the bottom 16 of the tank 10, such as from condensation. However, in using the leak detector 14 a small amount of water is inserted into a tank 10 being tested for leaks sufficient to cover the bottom 16 of the tank 10. Also, experience has shown that if there is a leak in the tank 10, it usually is in the bottom wall 16 or in a lower end portion of the side wall (not shown) of the tank adjacent the bottom wall 16. Accordingly, when there is a leak, level 18 of a water layer 20 will tend to fall.

The hydrocarbon, petroleum or other petrochemical liquid 22 stored in the tank 10 typically has a low electrical conductivity (a resistivity of effectively infinite ohms-cm), while the water 20 at the bottom 16 of the tank 10 will typically have a much higher conductivity (a resistivity of 8-20 M cm) as a result of the electrolytes therein. Also, at an interface 24 between the hydrocarbon liquid 22 which is situated above the water layer 20, there is a transition layer 24 which has a varying conductivity and which under certain conditions may be made up of a thin mat or layer 24 of debris that have somehow found their way into the tank 10 or have been formed therein.

As will be described in greater detail hereinafter, the leak detector 14 enables one to accurately determine the presence of a leak by determining changes in the water level 18, i.e., changes in the height of the interface 24 above the bottom 16 of the tank 10. This is determined by detecting changes in thermal or electrical conductivity or current flow in sensor circuits 30 (FIG. 10) for example coupled to a sensor assembly 32 (FIG. 2) located at the interface 24 between the upper liquid hydrocarbon 22 and the lower water layer 20.

The leak detector 14 will now be described below with reference to a sensor assembly 32 for sensing electrical conductivity after which a thermal sensor assembly 322 for sensing thermal conductivity will be As shown in FIG. 2, the leak detector 14 comprises the sensor assembly 32 which is received through an upper open end 36 of a cylindrical casing 38 having mounted at the lower end 40 thereof a base assembly 42. The base assembly 42 typically includes an annular ring member 44 having affixed therein a generally circular flat bottom plate or wall 46 (FIG. 3) which closes off the lower end 40 of the cylindrical casing 38.

Mounted to the bottom wall 46 are three feet 51, 52, 53 which extend downwardly and which include threadably adjustably extendable, pointed prongs 61, 62 and 63 adapted to extend through any sludge at the bottom of the tank and rest on the bottom wall 16 of the tank 10.

The base assembly 42 also includes a skirt or flange 64, generally frustoconical in shape, which flares upwardly and radially outwardly from the annular ring member 44 and which extends in a vertical direction above four port openings 71-74 (FIGS. 1 and 3) in the lower end 40 of the cylindrical casing 38.

As best shown in FIGS. 2 and 3, the sensor assembly 32 extends downwardly through the open upper end 36 of the cylindrical casing 38 and is fixed at its upper end to a cap member 76 which includes a circular flat top portion 78 having at least one vent hole 79 (FIG. 3) and an annular portion 80 slightly larger in diameter than the diameter of the cylindrical casing 38. The cap member 76 is fixed to the cylindrical casing 38 by wing nuts 81-83 (FIG. 4).

Mounted to the top portion 78 of the cap member 76 is a generally inverted U-shaped bracket member 86 having two upstanding leg portions 87 and 88 and an upper bight portion 89 to which is affixed an eyelet 90 which in turn has a cable 92 (FIG. 1) connected thereto for raising and lowering the leak detector 14 out of and into the tank of petroleum product (or liquid HC).

The top portion 78 also has an opening therethrough for receiving a tubular connector 94 which receives therethrough a multiconductor cable 96 which, at its lower end 98 has a plurality 100 of insulated wire conductors (typically 25) extending therefrom which extend to and are connected into the sensor assembly 32. The tubular connector 94 is of the type which will permit movement of the cable upwardly or downwardly into the cylindrical casing 38.

The sensor assembly 32 is mounted on a threaded rod 104 having a free lower end 106 and an upper end 108 which is journalled in the top portion 78 of the cap member 76 and which has a knob 110 at the upper end 80 thereof for rotating the rod 104.

Also fixed to and extending downwardly from the top portion 78 are spaced apart guide rods 111 and 112 which extend on either side of the threaded rod 104 such that the two guide rods 111 and 112 (and the threaded rod 104 therebetween) lie generally in the same plane. The guide rods 111 and 112 are each fixed at their upper end to the top portion 78 of the cap member 76 and are each fixed at their lower ends to a circular plate 113 located adjacent a circular plate 114 of the base assembly 42.

A hollow space 115 is defined between the plates 46 and 114 for receiving a ballast material 116 such as lead shot or ball bearings.

Spaced slightly above the lower circular plate 113 is a guide block 11B. The lower end of the threaded rod 104 is journalled in the guide block 118 which has two spaced apart openings therein for enabling the block 118 to be slidably received on the guide rods 111 and 112.

The sensor assembly 32 includes an upper block 120 which has two openings for slidably receiving the guide rods 111 and 112. It will be understood from FIGS. 2, 5 and 6 that the block 120 also has a central threaded opening through which the threaded rod 104 extends whereby rotation of the knob 110 to rotate the threaded rod 104 will cause raising or lowering of the block 120 on the guide rods 111 and 112.

Figure 7:
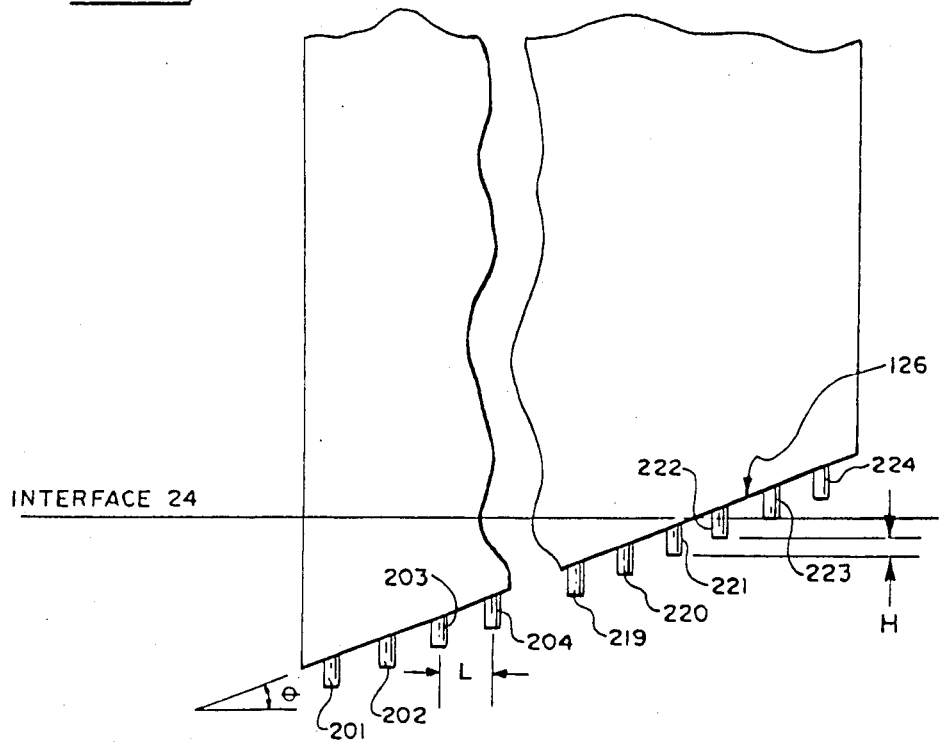
FIG. 7 is an enlarged vertical plan view with portions broken away of a sensor array of the sensor assembly shown in FIGS. 2 and 3.

The sensor assembly 32 further includes a cable connector block assembly 122 which is mounted on top of the upper block 120. Also mounted to the upper block 120 and extending downwardly therefrom is a sensor plate assembly 124 into which the multiple insulated conductors 100 extend and in which they are clamped in an equally spaced generally vertical parallel manner as shown in FIGS. 2, 3, 7 and 8. The lower edge of the plate assembly 124 has a bottom edge 126 which is inclined to the horizontal at a predetermined angle as shown in FIG. 7. The insulated wire conductors 100 are insulated from metallic parts of the plate assembly 124 which can be made of metallic conducting and/or nonmetallic nonconducting plate portions so long as the insulated wire conductors 100 are insulated from one another and from an outer metal plate 128 of the plate assembly 124 which serves as a ground (current return) element.

However, the lower ends of the wire conductors 100 such as wire conductor ends 201, 202, 203, 204 . . . 219, 220, 221, 222, 223, and 224 are bare, uninsulated, exposed end portions 201-224 spaced vertically above each other a predetermined distance H and horizontally a predetermined distance L from each other on the inclined bottom edge 126 of the plate assembly 124 as shown in FIG. 7 for providing an array of sensors (conductor end portions) 201-224 having a predetermined sensitivity as will be described in greater detail hereinafter.

The circular plates 46 and 114 are held to the circular plate 113 by a bolt 230 which extends through the center of the assembly 42.

Also mounted to the top portion 78 of the cap member 76 is a fitting 232 which receives a tubing 233 that extends through the cap member 76 to a coupling 234 (FIG. 6) mounted to the block 120 and connected to a tubing member 235 having a curved end portion 236 that is positioned so that an open end 238 thereof is aimed at and in line with the area adjacent to and parallel to the lower edge 126 of the sensor plate assembly 124. The tubing 233 is flexible and extends through the fitting 232 to the coupling 234 connected to the tubular member 235 to enable an operator to wash, scrub or flush off the array of sensors (bare conductor end portions) 201-224 periodically such as with the petroleum liquid in the tank 10 or nitrogen gas.

In the use of the leak detector 14 (after a quantity of water is introduced into the tank 10 to cover the bottom 16), an operator will first lower the leak detector 14 through the hole 12 as shown in FIG. 1. The operator then will let the detector 14 settle through any sludge at the bottom 16 of the tank 10 until it is safe to assume that the detector 14 is resting on the bottom 16 of the tank 10. The detector 14 is allowed to rest in this position as shown in FIG. 1 for a short period of time after which it is raised out of the tank 10.

A generally vertical layer of water sensing material 248 is provided on the exterior surface of the casing 38 as shown in FIG. 1. The portion 249 of the layer 248 situated in the water will change color to establish a water level line 250. Alternatively, a float type or optical sensor can be used to initially determine the water level line 250. After the detector 14 is raised out of the tank 10, the operator will turn the knob 110 to adjust the position of the sensor assembly 32 so that the inclined lower edge 126 of the plate assembly 124 having the sensors (conductor end portions) 201-224 thereon will extend through the horizontal plane containing the water level line 250 and interface 24 between the water layer 20 and the liquid hydrocarbon 22 in the tank 10 when the detector 14 is reinserted into the tank 10.

Then the operator again lowers the leak detector 14 back into the tank 10 to the bottom 16 thereof so that the leak detector 14 is resting firmly on the bottom 16 of the tank 10. Then conductivity can be detected using a conventional conductivity meter, ohm meter or volt meter.

In one embodiment shown in FIG. 9, a display panel 254 can be utilized which will indicate the position of the interface relative to the inclined lower edge 126 of the plate assembly 124. This is accomplished by the electrical circuits 30 shown in FIG. 10. Each circuit 30 includes one of the conductors 100 and the sensor end portion thereof, such as the conductor end portion 201. Each circuit 30 also includes the liquid between the sensor (e. g., sensor 201) and the grounded plate 128, a common conductor 256 connected to the plate 128, a lamp circuit 258 including a lamp (LED) 260, a resistor 262 and a capacitor 264, and a signal processing circuit 266 including four resistors 271-274, a NAND gate 276 and an inverter 278.

In addition or as an alternative, the sensors or conductor ends 201-224 can be coupled to input ports of a microprocessor 280 (FIG. 9) which will note the conductivity or voltage levels on each of the conductors connected to each of the sensors (conductor ends) 201-224 and note the voltage levels at the respective input ports and what changes take place over a given period of time.

Another conductivity measuring alternative is a multi-position switch with an a.c. conductivity meter.

In this way, one can determine over a period of time whether there has been an increase in moisture or water in the tank 10 or whether there has been a leak by reason of a decrease of water in the tank 10.

Each of the circuits 30 provides a simple indication of the status of the water-petroleum liquid interface 24 and can be used in addition to or in place of a conductivity meter 282 on the control panel 254 shown in FIG. 9. The position of the interface layer 24 is indicated by a row or column 286 of twenty-four (24) light emitting diodes lamps 260, each one corresponding to and coupled to one of the sensor forming conductor end portions 201-224.

The LEDs 260 corresponding to the sensors immersed in the low conductivity hydrocarbon liquid 22 will flash on and off approximately twice per second. Those LEDs 260 associated with the water-contacting sensors 201-224 remain continuously energized. In this way, if the level of the interface 24 changes due to a leak, those ones of the LEDs 260 that were previously energized begin to flash on and off as the water level 18 in the tank 10 decreases.

Each of the circuits 30 can be energized by batteries so that the leak detector has a self-contained power supply.

As noted above, FIG. 9 illustrates a leak detector system 300 including the leak detector 14, the control panel 254 and the optional microprocessor 280. The control panel is shown with two rows of sixteen (16) lamps, although as noted above preferably one row or column of twenty-four (24) lamps are preferred. Also, the control panel 254 is shown with the conductivity meter 282 mounted thereon together with a calibration control knob 302. These items can be eliminated, if desired. Also an ON and OFF switch 304 can be provided for energizing the control panel 254.

Further, it will be understood that all monitoring can be effected solely with the icroprocessor which can be programmed to poll the inputs thereof connected to the sensors 201-224 periodically, such as once every hour. Then, of course, any changes in conductivity over any number of the sensors or bare end portions 201-224 can be correlated with the distance H, the distance L, the angle and the time elapsed to determine the rate of leakage.

It should be noted that the sensitivity of the array of sensors can be altered by changing the angle, the angle of inclination of the lower edge 126 of the plate assembly 124 to the horizontal.

From empirical tests, it appears that a preferred angle for the angle is 20°.

In FIG. 8 there is illustrated a modified embodiment of a sensor assembly 322 including a plate assembly 324 wherein the plate assembly 324 is adapted to be rotated about an axis perpendicular to the plate assembly 324 so as to alter the angle. In this assembly, a lower edge 326 of the plate assembly 324 is perpendicular to the side edges of the plate assembly 324. In this embodiment, the sensors 330 are thermal sensors each of which extends an equal distance from the edge 326. The sensitivity of this array of sensors is adjusted by rotating the plate assembly 324 so as to change the angle of the lower edge 326 relative to the horizontal. This will result in a change in the distance H measured vertically between the exposed ends of adjacent sensors of the plurality 330 of sensors.

In a thermal system, the same voltage is applied to each sensor 330 and the liquid medium will determine how much heat is dissipated by each sensor and the rate of heat dissipation. This will determine a given steady state current. Then when the liquid medium is changed, such as from petroleum product to water, the heat dissipation will change causing a change in the steady state current. This change in current is measured to determine a change in the water level.

Preferably, the exposed end portions 201-224 of the sensing conductors 100 are "tinned", i.e., coated with an anti-corrosive metal, such as silver, gold or tin.

Figure 11:
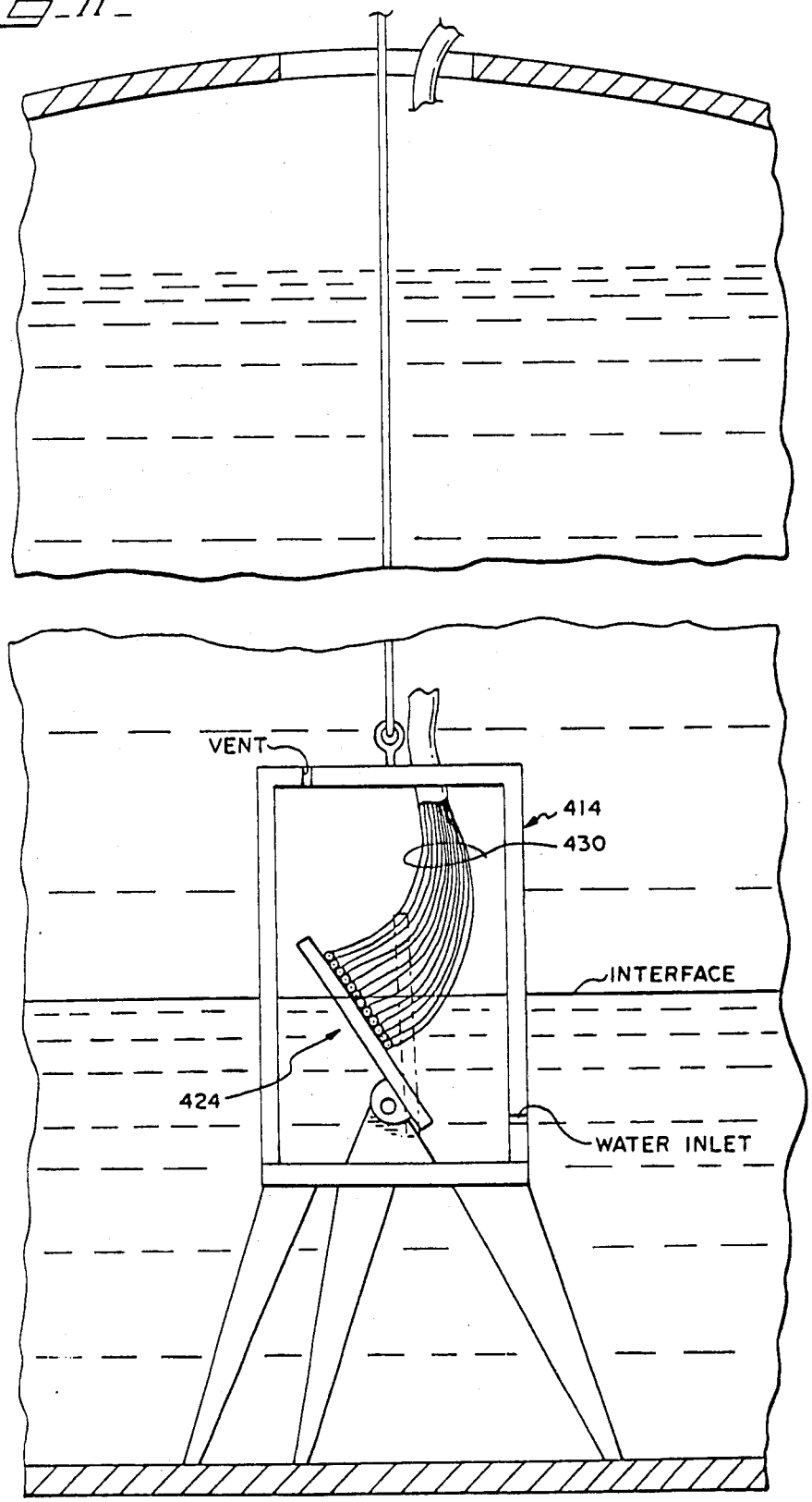
FIG. 11 is a fragmentary vertical sectional view of an above ground storage tank, with major portions broken away and shows a modified embodiment of the leak detector of the present invention resting on the bottom of the tank.

In FIG. 11 there is illustrated an alternative embodiment of a leak detector assembly 414 of the present invention where, instead of having a rotatable plate assembly 324 as shown in FIG. 8 which lies in a generally vertical plane and is rotated in that plane, the modified leak detector 414 shown in FIG. 11 includes a plate assembly 424 which also lies in a vertical plane but which is rotatable about an axis lying in or parallel to the plane of the plate assembly 424. Here a plurality 430 of insulated wire conductors are mounted on one side of the plate assembly 424 and when the plate assembly 424 is rotated, the relative vertical distance between adjacent bare end portions of the insulated wire conductors 430 is changed in a manner similar to rotating the plate assembly 324 in FIG. 8 as described above.

It will be appreciated that in the embodiment shown in FIG. 7, the sensitivity is fixed whereas in the embodiment shown in FIGS. 8 and 11, the sensitivity of the array of sensors can be altered.

Further it will be appreciated that the frustoconical skirt or flange 64 provides a deflecting baffle for deflecting any debris at the interface 24 between the liquid 22 and the water 20 away from the ports 71-74 when the leak detector 14 is lowered into the tank 10. Additionally, in case any of this debris should gain access to the interior of the cylindrical casing 38, the tubing member 235 for washing or flushing the inclined lower edge 126 of the plate assembly 124 enables the sensors 201-224 to be washed or cleaned.

Extensive testing of the leak detector was conducted at an Amoco facility in Casper, Wyo. and produced surprisingly good results.

For example, in leak tests for a tank with gasoline (tank No. 325) and a tank for light fuel oil (tank No. 322) maximum leak rates of 15 gal/hr and 10 gal/hr, respectively, were detected using a leak detector constructed according to the teachings of the present invention. Accuracy of the detector is verified by determining the leak rate while drawing water from the tank using the detector and comparing that determined rate with the actual measured rate of water drained off from the tank.

The interface between the liquid hydrocarbon and water in the tank, particularly in an old tank, is typically not a "clean" interface, but rather a thin layer of material which although of very small thickness, includes a lot of debris, particles and fibers. Typically, it contains a mixture of hydrocarbons and water, fibrous material, particulate matter such as dirt, and metal particulate matter, such as rust or steel fibers. Such an interface does not have a "clean" line of change from hydrocarbon to water. Moreover, notwithstanding the provision of the baffle 64 on the leak detector 14 shown in FIG. 1, some of this material at the interface can and does gain access to the interior of the leak detector and flows to the area of the interface within the leak detector creating an "unclean" interface which contains material that can foul the wire conductor ends 201-224 defining the conductivity sensors and foul, short or coat the sensors 201-224.

In other words, the adherence of particulate matter and fibers to the sensors can affect the sensing ability of the sensors. Furthermore, if the particulate matter or fibers are made of metal, they could cause a short between adjacent sensors 201-224.

Thus, critical to the operation of the leak detector 14 is the setting up of a clean, sharp interface between a layer of water at the bottom of the tank and the suspended liquid hydrocarbon in the tank. As noted above, in some tanks, the interface may be contaminated with dirt and particles of rust while in other tanks the interface may be diffused and "thick" due to the formation of an emulsion layer. When such conditions exist, the leak detection results are often inconclusive.

Also, notwithstanding the provision of the water sensing material 248 on the exterior surface of the casing 38 for determining the water level in a tank, the existence of an "unclean" and/or "thick" interface as defined above renders the visual determination of the water level line 150 somewhat indefinite and inaccurate.

Figure 12:
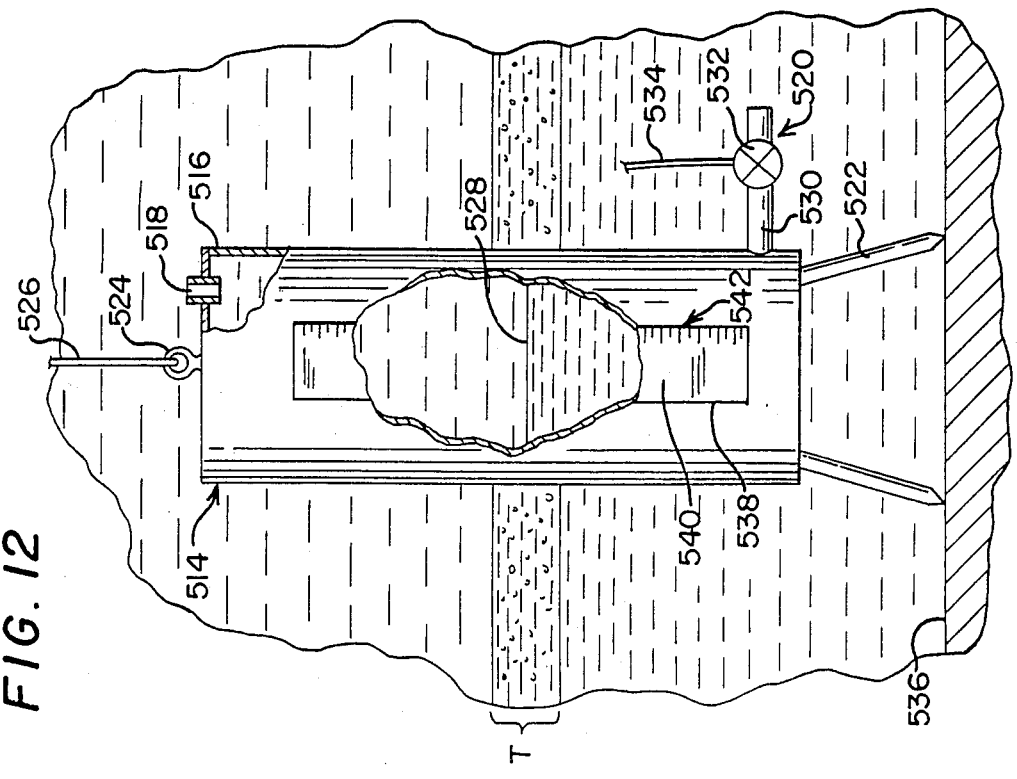
FIG. 12 is a vertical elevational view of an interface measuring device similar in shape to the leak detector shown in FIG. 1 and is shown resting on the bottom of a tank with portions broken away.

These problems can be avoided by providing a means for establishing and determining a clean interface in a tank. Such a means in the form of an interface determining device 514 is shown in FIG. 12 and includes a container 516, which can be in the form of a generally cylindrical casing 516, similar to the casing 38, which is totally enclosed except for a hydrocarbon inlet opening 518 at the top of the container 516 and a water inlet/outlet system 520 mounted to the lower end of the container 516.

Like the leak detector 14, the interface determining device 514 has feet 522 which are fixed to and extend below the container 516 and an eye-ring 524 fixed to the top of the casing 516 for mounting a cable 526 for raising and lowering the device 514 into and out of a tank.

The container or casing 516 of the device 514 does not have a baffle 64 or port openings 71-74 in the sidewall thereof.

The interface detecting device 514 is adapted to sense and determine the exact line of interface or water level height in the tank. For the purposes of illustration, the interface layer is shown with an exaggerated thickness T in FIG. 12 and the actual line 528 of interface or water level height is shown within the container 516.

The water inlet/outlet system 520 connected to the bottom of the container 516 includes a tube 530 having a valve 532 therein. A control line 534 is connected to the valve 532 and although not shown in complete detail, extends to the cable 526 and is raised and lowered with the cable 526.

In the use of the interface detecting device 514, one can first fill the container 516 with water or, in the alternative, first lower the container 516 a small distance into the liquid hydrocarbon, allow it to fill with liquid hydrocarbon through the upper opening 518 and then lower the device 514 to the bottom of a tank. After the device 514 has been at rest on the bottom 536 of the tank for a short time, a control signal (pneumatic, electrical or hydraulic) is supplied via the control line 534 to the valve 532 to open the water inlet/outlet system 520 to allow water to flow out of the container until the liquid hydrocarbon has reached the water level of the tank (including the small amount of water added from the container 516) or water that had been at the bottom 536 of the tank has flowed into the container 516 to allow the water level in the container 516 to rise to the "clean" interface line 528. In this way, a "clean" interface or water line 528 is established within the container 516 of the device 514.

To make certain that a proper measurement or equilibrium is obtained, the device 514 is allowed to rest on the bottom 536 of the tank for a short time. Once the disturbance of the "unclean" interface layer T has settled and equilibrium between the water and liquid hydrocarbon in the container 516 has been reached, a signal is sent on the control line 534 to close the valve 532. Then the device 514 is raised and a determination is made as to where the exact line 528 of interface between water and hydrocarbons exists within the container 516 of the device 514. To facilitate this determination, the device 514 can be provided with an elongate window 538 having a transparent (glass) lens 540 therein. Preferably, such a lens 540 will also be provided with indicia markings 542 thereon.

Then, when the device 514 is raised out of the tank, the lens 540 can be cleaned off and a visual determination can be made as to the location of the clean interface line or water level height 528 in the container 516 of the device 514 with reference to the indicia markings 542. This line 528 of the "clean" interface can then be used for setting the position of the sensor assembly 32 in a leak detector 14 so that it intersects at an angle the line 528 of the "clean" interface.

For this purpose, the interface detecting device 514 preferably has the same shape and dimensions of the leak detector 14 or (as will be described in greater detail below in connection with the description of FIGS. 13-17) of a modified leak detector which is adapted to ensure the establishment of a "clean" interface line 528 in the modified detector.

Figure 13:
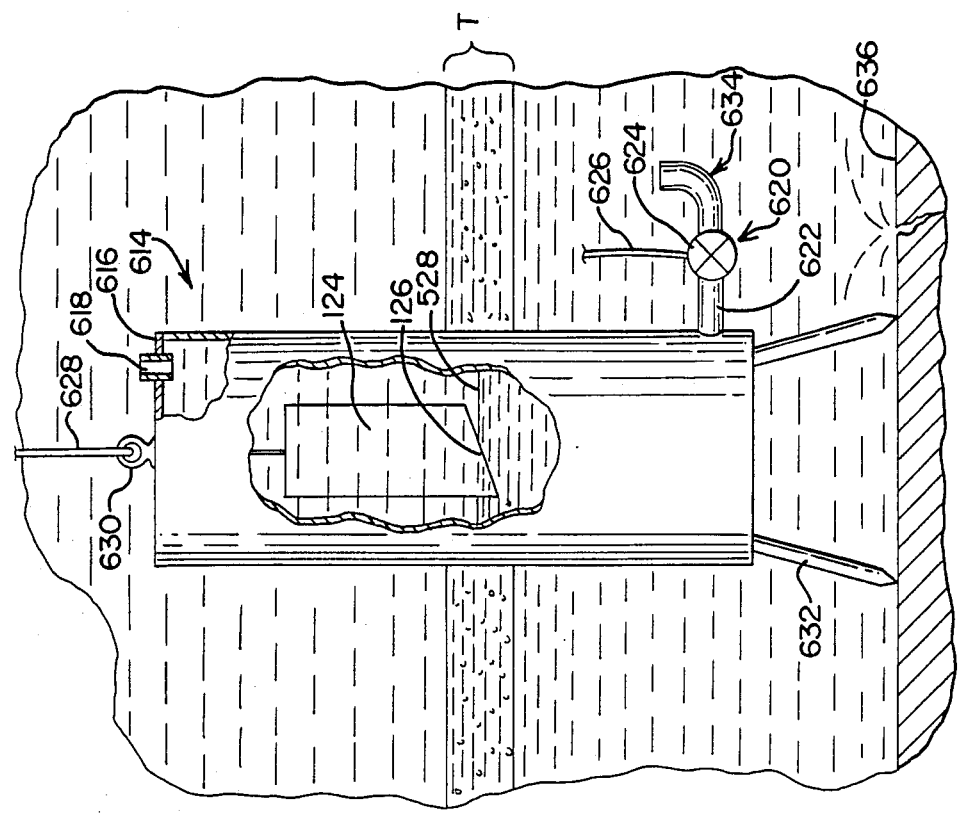
FIG. 13 is a side elevational view of a modified leak detector with portions broken away and is shown resting on the bottom of a tank.

A modified leak detector 614 including a completely enclosed casing 616 having a liquid hydrocarbon inlet opening 618 at the top thereof, and a water inlet/outlet system 620 connected to the lower end of the container 616, is shown in FIG. 13. Here the internal construction of the sensor assembly 32 therein is the same as of the sensor assembly 32 shown in FIG. 3 and only a portion of the assembly 32, namely the sensor plate assembly 124 and the inclined bottom edge 126 thereof are shown in FIG. 13. The leak detector 614 has the inclined lower edge 126 of the plate assembly 124 positioned to intersect the line 528 of a "clean" interface established within the casing 616 of the leak detector 614.

The construction of the casing portion of the leak detector 614 is substantially identical to the construction of the casing portion of the device 514. In this respect, the water inlet/outlet system 620 includes a tube 622 having a valve 624 therein and a control line 626 that extends from the valve 624 to a cable 628 connected to an eyelet 630 on the top of the casing 616 for being raised and lowered with the cable 628. Also, the casing 616 has three or more feet 632 depending from the lower end of the casing 616 similar to the feet 522 shown in FIG. 12. In this embodiment, an outer end 634 of the water tube 622 is shaped in the form of an L that extends vertically upwardly. This shape may be preferred over the horizontally opening tube 530 in the device 514 shown in FIG. 12 to minimize "catching" any of the interface material T in the outer end of the tube 530 or 622.

In the use of the leak detector 614, the casing 616 is either filled with water or filled with liquid hydrocarbon and then lowered into the tank containing the liquid hydrocarbon until it is resting on the bottom 636 of the tank as shown in FIG. 13. Then, the valve 624 is opened to allow water in the tank to enter into the casing 616 or to allow clean water in the casing 616 to escape out the water tube 622 into the tank.

It will be appreciated that a preferred method of use is to fill the casing 616 with water first and in that way ensure that clean water is in the casing 616 of the leak detector 614 when the interface is established thereby further to ensure minimal or no contamination of the line 528 of clean interface within the casing 616.

Figure 14:
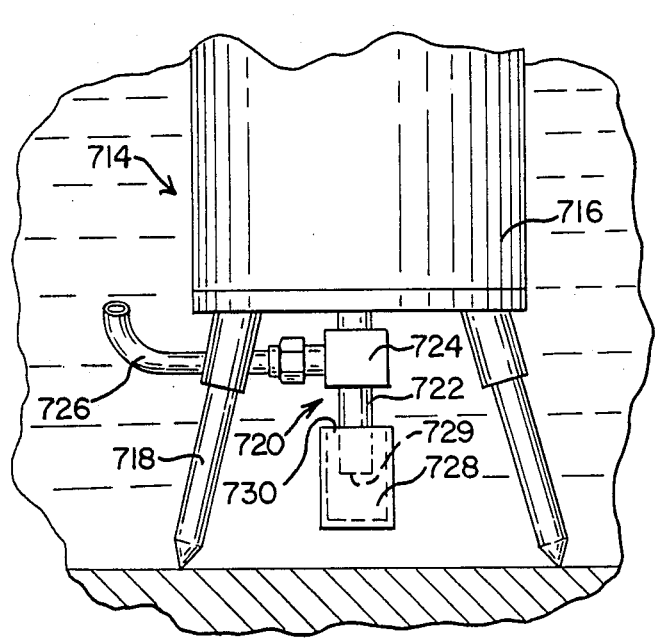
FIG. 14 is a fragmentary view of the bottom portion of the leak detector shown in FIG. 13 but with a modified water inlet/outlet system.

In FIG. 14 there is shown a modified lower end of a leak detector 714. Here the leak detector 714 includes a casing 716, a liquid hydrocarbon inlet opening (not shown) at the upper end of the casing (not shown), feet 718, a water inlet/outlet system 720 including a water tube 722 which extends downwardly from the bottom of the casing 716, a valve 724 and a control line 726 for pneumatic, electric or hydraulic control of the valve 724.

In this embodiment, a baffle or cap 728 is fixed to the water tube 722 in such a manner as to cover and protect the lower end 729 of the water tube 722 from "catching" any of the particulate or fibrous matted material of the interface T when the leak detector 714 is lowered into the tank. The cap 728 has passageways 730 between the cap 728 and the tube 722 whereby water can enter the upper end of the cap 728 and flow downwardly within the cap 728 and then into the lower end 729 of the water tube 722.

Figure 15:
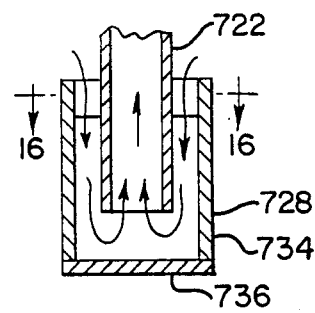
FIG. 15 is a vertical sectional view through the water inlet/outlet system located at the lower end of the leak detector shown in FIG. 14.
Figure 16:
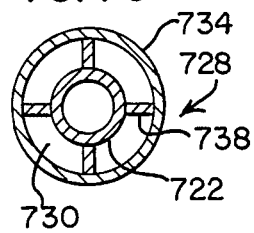
FIG. 16 is a sectional view taken along line 16—16 of FIG. 15.

As shown in FIGS. 15 and 16, the cap 728 is generally cylindrical in shape and has a cylindrical wall 734 with a closed bottom wall 736. Then, four short radial spokes 738 are provided equally spaced around the tube 722 and extend between and are fixed to the tube 722 and the cylindrical wall 734 of the cap 728. The spaces between the spokes 738 define the water inlet/outlet passageways 730.

It may be desirable to eliminate the need for a control line, e.g., control line 534, 626 or 726, for controlling the opening and closing of the valves 532, 624 or 724 in the device 514, leak detector 614 or leak detector 714 shown in FIGS. 12, 13 and 14. Such can be accomplished with the valve structure 810 shown in FIGS. 17 and 18.

Figure 17:
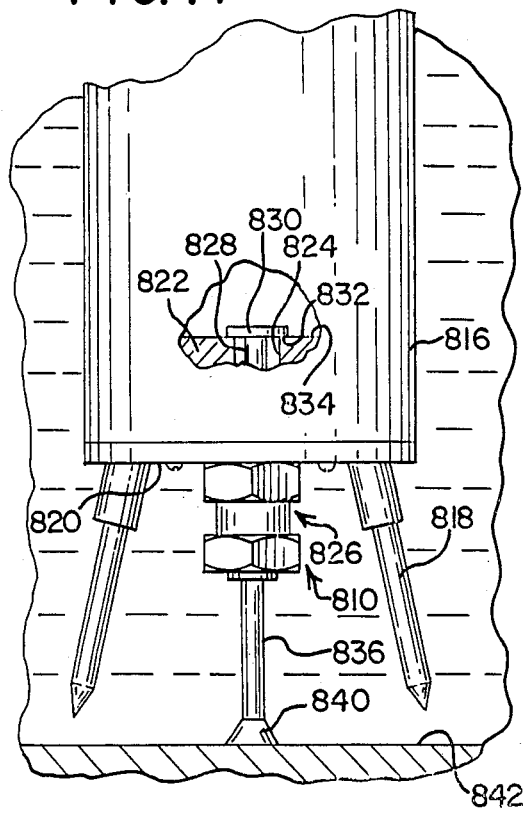
FIG. 17 is a fragmentary view with portions broken away of the lower end of another modified leak detector as it is being lowered to the bottom of a tank and shows another embodiment of a water inlet/outlet system.

Referring now to FIG. 17 there is illustrated therein a lower end of a casing 816 which can be used for the interface detecting device 514 or the leak detectors 614 or 714. The casing 816 has three or more feet 818 as shown. The bottom end 820 of the casing 816 has a block or plate 822 therein with a vertically extending axial bore 824 therethrough. The axial bore 824 communicates with a fitting or coupling 826 fixed to the bottom end 820 of the casing 816.

The valve structure 810 includes a rod 828 which extends through the axial bore 824 and the fitting 826 and has a valve disc 830 at the upper end thereof which seats on a valve seat 832 on the upper surface 834 of the block or plate 822 and around the axial bore 824 to seal the axial bore 824. Fixed to or extending downwardly from the rod 828 and beneath the fitting 826 is a plunger portion 836 having a foot or stop 840 at the lower end thereof which has a sufficient weight or is weighted so that before the feet 818 engage the bottom 842 of the tank and while the casing 816 is being lowered into the tank, the plunger portion 836 will depend from the fitting 826 so as to hold the valve disc 830 on the valve seat 832 closing the axial bore 824.

Figure 18:
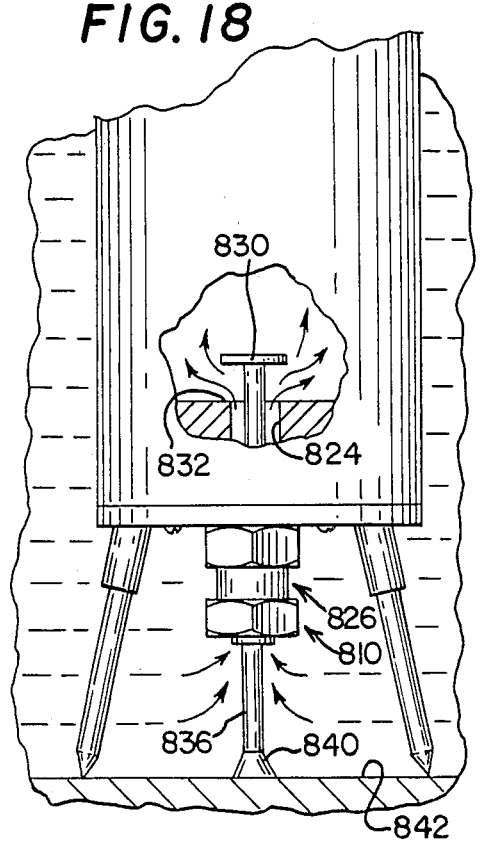
FIG. 18 is a fragmentary side elevational view of a lower portion of the modified leak detector shown in FIG. 17 after it is resting on the bottom and shows the open position of the water inlet/outlet system.

Then, as shown in FIG. 18, when the foot 840 hits the bottom 842 of the tank, it causes the plunger portion 836 to move upwardly through the fitting 826 causing the rod 828 to move the valve disc 830 upwardly off the valve seat 832 to allow water to enter into or escape through the fitting 826 and the axial bore 824.

It will be understood that suitable guide or bearing means are provided in the fitting 826 for the plunger portion 836 and for aligning the valve disc 830 in a central position over the axial bore 824. Also, passage means (not shown) are provided in the fitting around the plunger portion 836 for water flow into or out of the casing 816.

It will be appreciated that not only does this valve structure 810 eliminate the need for a control line, but also it is simple in construction and presumably much less expensive than a pneumatically, electrically or hydraulically controlled valve.

From the foregoing description, it will be apparent that the apparatus for establishing a clean interface in a leak detector shown in FIGS. 12–18 and described above, has a number of advantages, some of which have been described above and others of which are inherent in the invention.

For example, the apparatus can be used separately in the interface detecting device 514 or in a casing 616 or 716 for leak detectors 614 or 714 for preventing fouling of the conductivity sensing electrodes of the leak detector with debris at or in the "unclean interface" between the petroleum product and the water in the tank.

Additionally, one could use the interface determining device 514 as a leak detector. This would be accomplished as follows: first, the interface determining device 514 is lowered into a tank and allowed to rest on the bottom for a short time. Then, a clean interface is established in the manner described above within the container 516 of the device 514. Next, the device 514 is raised from the tank and a determination is made as to the position of the interface within the container 516. Subsequently, at timed intervals, such as every six hours, the above procedure of, lowering the interface determining device 514 into the tank, establishing a clean interface and, then making another determination of the position of the interface within the container 516, is repeated.

The determinations of the position of the clean interface in the container 516 are recorded together with the times the determinations were made so that if there is a change in the position of the clean interface one can determine, from the dimensions of the tank, and the changes in the position of the interface within the container 516, the amount of leakage from the tank and the rate of leakage.

Also it will be apparent from the foregoing description that various modifications can be made to the apparatus for establishing a clean interface in a leak detector of the present invention without departing from the teachings of the invention. Accordingly, the scope of the invention is only to be limited as necessitated by the accompanying claims.

We claim:

1. A method for determining the presence of a leak in an above ground tank of liquid hydrocarbons having a lower specific gravity and a lower conductivity than water, said method comprising the steps of:

determining the level of water in said tank;

establishing a clean interface between the liquid hydrocarbon and water in the ank in the area where sensing takes place to prevent fouling, with debris normally at the interface, of sensing means utilized in sensing changes in the level of water in the tank;

sensing changes in the level of water in the tank in said area over time by sensing changes in conductivity at points along a line extending across the clean interface in said area between the liquid hydrocarbons and the water in the tank: and, determining the amount and rate of leakage relative to the capacity of the tank and the change in the level of the water in the tank over a selected time period.

2. The method of claim 1 wherein said step of determining the level of water in the tank includes:

lowering a container which is substantially closed and which is provided with an opening at the upper end of the container into the tank until it reaches the bottom of the tank;

opening an inlet/outlet opening in the lower end of the container after the container has settled on the bottom of the tank;

allowing a clean interface to be established in the container;

closing the inlet/outlet opening;

raising the container out of the tank; and determining the position of the interface in the container.

3. The method of claim 2 wherein said container is first filled with clean water and said inlet/outlet opening is opened to allow clean water to flow out of the tank and liquid hydrocarbon to flow into the tank through the opening at the upper end of the container to establish the clean interface.

4. The method of claim 2 wherein liquid hydrocarbons are allowed to flow into the container through the opening at the upper end thereof as it is lowered into the tank and after said container is resting on the bottom of the tank said inlet/outlet opening is opened to allow water in the tank to flow into the container to establish the clean interface.

5. The method of claim 2 wherein said step of determining the position of the interface in the container includes providing a window with a transparent lens in the side of the container and viewing the position of the clean interface through the lens.

6. The method of claim 2 including the step of providing said leak detector with a casing which has the identical top to bottom dimensions of said container so that the level in said container can be used to determine the setting of the conductivity sensors across the clean interface in said casing.

7. A method for determining the presence of a leak in an above ground tank of liquid hydrocarbon having a lower specific gravity and a lower conductivity than water, said method comprising the steps of:

determining the level of water in the tank;

establishing a clean interface between the liquid hydrocarbon and water in the tank in the area where sensing takes place to prevent fouling, with debris normally at the interface, of sensing means utilized in sensing changes in the level of water in the tank;

sensing changes in the level of water in the tank including the step of providing an array of sensors along a line inclined to the horizontal and placing said line of sensors across the clean interface between the liquid and the water in the tank; and determining the amount and rate of leakage relative to the capacity of the tank and the change in the level of the water in the tank over a selected time period.

8. A method for determining the presence of a leak in an above ground tank of liquid hydrocarbon having a lower specific gravity and a lower conductivity than water, said method comprising the steps of:

determining the level of water in the tank;

establishing a clean interface between the liquid hydrocarbon and water in the tank in the area where sensing takes place to prevent fouling, with debris normally at the interface, of sensing means utilized in sensing changes in the level of water in the tank;

sensing changes in the level of water in the tank over time including the step of providing an array of sensors along a line inclined to the horizontal and placing said line of sensors across the clean interface between the liquid and the water in the tank;

periodically washing or flushing the array of sensors; and determining the amount and rate of leakage relative to the capacity of the tank and the change in the level of the water in the tank over a selected time period.

9. A method for determining the presence of a leak in an above ground tank of liquid hydrocarbons having a lower specific gravity and a lower conductivity than water, said method comprising the steps of:

determining the level of water in said tank;

establishing a clean interface between the liquid hydrocarbon and water in the tank in the area where sensing takes place to prevent fouling, with debris normally at the interface, of sensing means utilized in sensing changes in the level of water in the tank;

sensing changes in the level of water in the tank by sensing changes in conductivity at points along a line extending across the clean interface between the liquid hydrocarbon and the water in the tank including monitoring the electrical conductivity at discrete, spaced, vertical positions in the liquid just above the clean interface of liquid and water and in the water just below the clean interface and noting changes in conductivity at those positions over time; and determining the amount and rate of leakage relative to the capacity of the tank and the change in the level of the water in the tank over a selected time period.

10. A method for determining the presence of a leak in an above ground tank of liquid hydrocarbons having a lower specific gravity and a lower conductivity than water, said method comprising the steps of:

determining the level of water in said tank;

establishing a clean interface area in the tank between the liquid hydrocarbon and water to prevent fouling with debris normally at the interface of conductivity sensors utilized in sensing changes in the level of water in the tank;

sensing changes in the level of water in the tank by sensing changes in conductivity at points along a line extending across the clean interface between the liquid hydrocarbons and the water in the tank including monitoring the thermal conductivity (heat dissipation) at discrete, spaced, vertical positions in the liquid just above the clean interface of liquid and water and in the water just below the interface and noting changes in conductivity at those positions over time; and determining the amount and rate of leakage relative to the capacity of the tank and the change in the level of the water in the tank over a selected time period.

11. A method for determining the presence of a leak in an above ground tank of liquid hydrocarbons having a lower specific gravity and a lower conductivity than water, said method comprising the steps of:

introducing an amount of water into the tank sufficient to cover the bottom of the tank sufficient to enable a determination of water level in the tank to be made;

determining the level of water in said tank;

establishing a clean interface between the liquid hydrocarbon and water in the tank in the area where sensing takes place to prevent ouling, with debris normally at the interface, of sensing means utilized in sensing changes in the level of water in the tank;

sensing changes in the level of water in the tank over time; and determining the amount and rate of leakage relative to the capacity of the tank and the change in the level of the water in the tank over a selected time period.

12. A method for determining the presence of a lea in an above ground tank of liquid hydrocarbons having a lower specific gravity and a lower conductivity than water, said method comprising the steps of:

determining the level of water in said tank;

establishing a clean interface between the liquid hydrocarbon and water in the tank in the area where sensing takes place to prevent fouling, with debris normally at the interface, of sensing means utilized in sensing changes in the level of water in the tank;

sensing changes in the level of water in the tank over time;

determining the amount and rate of leakage relative to the capacity of the tank and the change in the level of the water in the tank over a selected time period;

drawing water from the tank at a known rate; and repeating the above steps to verify the leak rate determinations made.

13. In a method for detecting leaks in an above ground tank, the step of first determining the level of water in the tank by establishing, in a container lowered into and resting on the bottom of the tank, a clean interface between water and a liquid hydrocarbon product in the tank which has entered into the container;

raising the container from the tank;

determining the position of the clean interface in the container;

at a predetermined interval of time later, lowering the container into the tank again;

establishing a clean interface;

raising the container from the tank;

determining the position of the clean interface within the container; and from any change in position of the clean interface in the container, the dimensions of the tank, and the time interval, determining the amount and rate of leakage.

14. In a method for detecting leaks in an above ground storage tank by sensing changes in conductivity along a line intersecting an interface between the liquid hydrocarbon product in the tank and water in the tank with a leak detector in a casing, the step of establishing a clean interface in the leak detector to prevent debris at the interface in the tank from fouling the sensing of changes of conductivity.

15. The method of claim 14 wherein said step of establishing a clean interface in the leak detector includes:

lowering the casing which is substantially closed and which is provided with an opening at the upper end of the container into the tank until it reaches the bottom of the tank;

opening an inlet/outlet opening in the lower end of the casing after the casing has settled on the bottom of the tank; and, allowing a clean interface to be established in the casing.

16. The method of claim 15 wherein said casing is first filled with clean water and said inlet/outlet opening is opened to allow clean water to flow out of the tank and liquid hydrocarbon to flow into the tank through the opening at the upper end of the casing to establish the clean interface.

17. The method of claim 15 wherein liquid hydrocarbons are allowed to flow into the casing through the opening at the upper end thereof as it is lowered into the tank and after the casing is resting on the bottom of the tank said inlet/outlet opening is opened to allow water in the tank to flow into the container to establish the clean interface.

18. The method of claim 15 including the steps of causing closing of the inlet/outlet opening while the leak detector is descending in the tank and causing opening of the inlet/outlet opening on engagement of the casing with the bottom of the tank.

19. The method of claim 14 including the step o preventing the inlet/outlet opening from catching debris when the casing is lowered through the dirty interface in the tank.

* * * * *

UNITED STATES PATENT OFFICE
CERTIFICATE OF CORRECTION

Patent No. 4,813,284        Dated  March 21, 1989

Inventor(s)  David C. Miller and Arthur R. Brown

It is certified that error appears in the above-identified patent and that said Letters Patent is hereby corrected as shown below:

| Column | Line | |
|---|---|---|
| 2 | 12 | "a lo" should read --a-- |
| 3 | 56 | "M cm)" should read --M$\sqrt{\Omega}$ - cm)-- |
| 4 | 9 | "be" should read --be described in connection with the description of FIG. 8.-- |
| 6 | 10 | "Will" should read --will-- |
| 7 | 21 | "icroprocessor" should read --microprocessor-- |
| 12 | 50 | "ank" should read --tank-- |
| 14 | 66 | "ouling" should read --fouling-- |
| 15 | 7 | "lea" should read --leak-- |
| 16 | 40 | "o" should read --of-- |

Signed and Sealed this

Tenth Day of July, 1990

*Attest:*

HARRY F. MANBECK, JR.

*Attesting Officer*        *Commissioner of Patents and Trademarks*